US012671631B2

(12) United States Patent
Ali et al.

(10) Patent No.:  US 12,671,631 B2
(45) Date of Patent:  Jun. 30, 2026

(54) SYSTEM AND METHOD FOR DETERMINING READINESS FOR MANAGED RUNTIME APPLICATION PROGRAM INTERFACE (API) APPLICATIONS VIA ARTIFICIAL INTELLIGENCE

(71) Applicant: BANK OF AMERICA CORPORATION, Charlotte, NC (US)

(72) Inventors: Amer Ali, Jersey City, NJ (US); Mohammad Saleem Gaziani, Plano, TX (US); Aaron Gee, Palm Coast, FL (US); Aisha Jenkins, Atlanta, GA (US); John Lozes, Wilmington, DE (US); Tonya Kyra Miller, Charlotte, NC (US); Manonmani Palanichamy, Fort Mill, SC (US); Jyothishwar Reddy Sama, Fort Mill, SC (US); Aravind Singtalur, McKinney, TX (US); Asha Thekkumpurath, Frisco, TX (US); Andrea M. Weisberger, Jacksonville, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 60 days.

(21) Appl. No.: 18/938,020

(22) Filed: Nov. 5, 2024

(65) Prior Publication Data

US 2026/0128956 A1    May 7, 2026

(51) Int. Cl.
| | |
|---|---|
| *H04L 41/16* | (2022.01) |
| *H04L 41/06* | (2022.01) |
| *H04L 67/02* | (2022.01) |

(52) U.S. Cl.
CPC .............. *H04L 41/16* (2013.01); *H04L 41/06* (2013.01); *H04L 67/02* (2013.01)

(58) Field of Classification Search
CPC .......... H04L 41/16; H04L 41/06; H04L 67/02
USPC ........................................................ 709/224
See application file for complete search history.

(56) References Cited

U.S. PATENT DOCUMENTS

| | | |
|---|---|---|
| 7,389,510 B2 | 6/2008 | Forrester |
| 8,997,088 B2 | 3/2015 | Gurikar et al. |
| 9,191,327 B2 | 11/2015 | Shieh |
| 9,392,077 B2 | 7/2016 | Borzycki et al. |
| 9,569,330 B2 | 2/2017 | Suit |

(Continued)

*Primary Examiner* — Zi Ye
(74) *Attorney, Agent, or Firm* — Moore & Van Allen PLLC; Nicholas C. Russell

(57) ABSTRACT

Systems, computer program products, and methods are described herein for determining readiness for managed runtime application program interface (API) applications via artificial intelligence. The present disclosure is configured to scan a set of API applications and their associated custom port hosted within a managed runtime environment using a custom port probe embedded within the managed runtime environment, where the custom port probe is operably coupled to a load balancer, where user traffic within the managed runtime environment is processed by the set of API applications and the custom port; initialize a set of components within the custom port for operation; verify readiness of the set of API application and the custom port probe using an artificial intelligence system; and transmit a notification to the load balancer indicating readiness of the set of API applications.

20 Claims, 6 Drawing Sheets

(56)  References Cited

U.S. PATENT DOCUMENTS

| | | | | |
|---|---|---|---|---|
| 9,588,821 | B2 | 3/2017 | Suit | |
| 10,104,169 | B1 | 10/2018 | Moniz et al. | |
| 10,567,396 | B2 * | 2/2020 | Ho | H04L 61/2503 |
| 10,616,315 | B2 | 4/2020 | Armstrong et al. | |
| 10,909,985 | B1 * | 2/2021 | Whittenburg | G10L 15/30 |
| 11,036,696 | B2 | 6/2021 | Higginson et al. | |
| 2011/0107327 | A1 | 5/2011 | Peterson et al. | |
| 2018/0145978 | A1 * | 5/2018 | Kim | H04L 41/0853 |
| 2021/0099479 | A1 * | 4/2021 | Prusov | H04L 63/1425 |
| 2021/0185073 | A1 * | 6/2021 | Ewaida | H04L 63/1433 |
| 2023/0222009 | A1 * | 7/2023 | Reineke | G06F 9/54 |
| | | | | 717/102 |

* cited by examiner

100

130

140

140

110

NETWORK

140

140

140

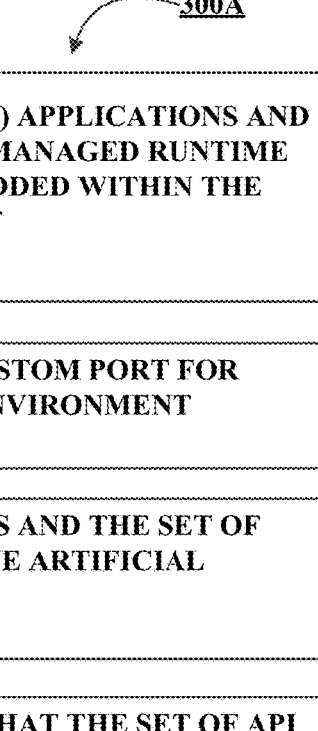

300A

SCAN A SET OF APPLICATION PROGRAM INTERFACE (API) APPLICATIONS AND THEIR ASSOCIATED CUSTOM PORT HOSTED WITHIN A MANAGED RUNTIME ENVIRONMENT USING A CUSTOM PORT PROBE EMBEDDED WITHIN THE MANAGED RUNTIME ENVIRONMENT
302

INITIALIZE A SET OF COMPONENTS WITHIN THE CUSTOM PORT FOR OPERATION WITHIN THE MANAGED RUNTIME ENVIRONMENT
304

VERIFY READINESS OF THE SET OF API APPLICATIONS AND THE SET OF COMPONENTS WITHIN THE CUSTOM PORT VIA THE ARTIFICIAL INTELLIGENCE SYSTEM
306

TRANSMIT A NOTIFICATION TO THE LOAD BALANCER THAT THE SET OF API APPLICATIONS HOSTED WITHIN THE MANAGED RUNTIME ENVIRONMENT ARE READY FOR INCOMING USER TRAFFIC
308

PAUSE INCOMING USER TRAFFIC TO THE MANAGED RUNTIME ENVIRONMENT UNTIL TRAFFIC WITHIN THE SET OF API APPLICATIONS AND THE CUSTOM PORT HAS BEEN PROCESSED
310A

TRANSMIT A NOTIFICATION TO THE LOAD BALANCER THAT THE SET OF API APPLICATIONS HOSTED WITHIN THE MANAGED RUNTIME ENVIRONMENT ARE READY FOR INCOMING USER TRAFFIC
308

DETECT ANOMALIES WITHIN THE CUSTOM PORT VIA THE ARTIFICIAL INTELLIGENCE SYSTEM
310B

SYSTEM AND METHOD FOR DETERMINING READINESS FOR MANAGED RUNTIME APPLICATION PROGRAM INTERFACE (API) APPLICATIONS VIA ARTIFICIAL INTELLIGENCE

TECHNOLOGICAL FIELD

Example embodiments of the present disclosure relate to determining readiness for managed runtime application program interface (API) applications via artificial intelligence.

BACKGROUND

Managed runtime environments may rely on port availability to determine the health and readiness of API applications. This may lead to complications as the port may be ready before the API applications.

Applicant has identified a number of deficiencies and problems associated with determining readiness for managed runtime API applications via artificial intelligence. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for determining readiness for managed runtime application program interface (API) applications via artificial intelligence. In one aspect, a system determining readiness for managed runtime API applications via artificial intelligence is presented. The system including a processing device, a non-transitory storage device containing instructions when executed by the processing device, causes the processing device to perform the steps of: scan a set of application program interface (API) applications and their associated custom port hosted within a managed runtime environment using a custom port probe embedded within the managed runtime environment, where the custom port probe is operably coupled to a load balancer within the managed runtime environment, where the custom port probe is at least partially powered by an artificial intelligence system, where user traffic within the managed runtime environment is processed by the set of API applications and custom port; initialize a set of components within the custom port for operation within the managed runtime environment; verify readiness of the set of API applications and the set of components within the custom port via the artificial intelligence system; and transmit a notification to the load balancer that the set of API applications hosted within the managed runtime environment are ready for incoming user traffic.

In some embodiments, the processing device is further configured to pause incoming user traffic to the managed runtime environment until traffic within the set of API applications and the custom port has been processed.

In some embodiments, the processing device is further configured to detect anomalies within the custom port via the artificial intelligence system.

In some embodiments, verification of readiness of the set of components within the custom port is determined by a set of criteria produced by the artificial intelligence system.

In some embodiments, the set of criteria comprises operating standards of the set of components within the custom port.

In some embodiments, the notification transmitted to the load balancer is generated by the artificial intelligence system.

In some embodiments, the notification further comprises a report comprising adjustments to the set of API applications within the managed runtime environment.

In another aspect, a computer program product for determining readiness for managed runtime application program interface (API) applications via artificial intelligence is presented. The computer program product comprising at least one non-transitory computer-readable medium having computer-readable program code portions embodied therein, the computer-readable program code portions which when executed by a processing device are configured to cause the processor to perform the following operations: scan a set of application program interface (API) applications and their associated custom port hosted within a managed runtime environment using a custom port probe embedded within the managed runtime environment, where the custom port probe is operably coupled to a load balancer within the managed runtime environment, where the custom port probe is at least partially powered by an artificial intelligence system, where user traffic within the managed runtime environment is processed by the set of API applications and custom port; initialize a set of components within the custom port for operation within the managed runtime environment; verify readiness of the set of API applications and the set of components within the custom port via the artificial intelligence system; and transmit a notification to the load balancer that the set of API applications hosted within the managed runtime environment are ready for incoming user traffic.

In some embodiments, the processing device is further configured to pause incoming user traffic to the managed runtime environment until traffic within the set of API applications and the custom port has been processed.

In some embodiments, the processing device is further configured to detect anomalies within the custom port via the artificial intelligence system.

In some embodiments, verification of readiness of the set of components within the custom port is determined by a set of criteria produced by the artificial intelligence system.

In some embodiments, the set of criteria comprises operating standards of the set of components within the custom port.

In some embodiments, the notification transmitted to the load balancer is generated by the artificial intelligence system.

In some embodiments, the notification further comprises a report comprising adjustments to the set of API applications within the managed runtime environment.

In another aspect, a computer-implemented method for determining readiness for managed runtime application program interface (API) applications via artificial intelligence the method comprising: scanning a set of application program interface (API) applications and their associated custom port hosted within a managed runtime environment using a custom port probe embedded within the managed runtime environment, where the custom port probe is operably coupled to a load balancer within the managed runtime environment, where the custom port probe is at least partially powered by an artificial intelligence system, where user traffic within the managed runtime environment is processed by the set of API applications and custom port;

initializing a set of components within the custom port for operation within the managed runtime environment; verifying readiness of the set of API applications and the set of components within the custom port via the artificial intelligence system; and transmitting a notification to the load balancer that the set of API applications hosted within the managed runtime environment are ready for incoming user traffic.

In some embodiments, the computer-implemented method further includes pausing incoming user traffic to the managed runtime environment until traffic within the set of API applications and the custom port has been processed.

In some embodiments, the computer-implemented method further includes detecting anomalies within the custom port via the artificial intelligence system.

In some embodiments, verification of readiness of the set of components within the custom port is determined by a set of criteria produced by the artificial intelligence system.

In some embodiments, the notification transmitted to the load balancer is generated by the artificial intelligence system.

In some embodiments, the notification further comprises a report comprising adjustments to the set of API applications within the managed runtime environment.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
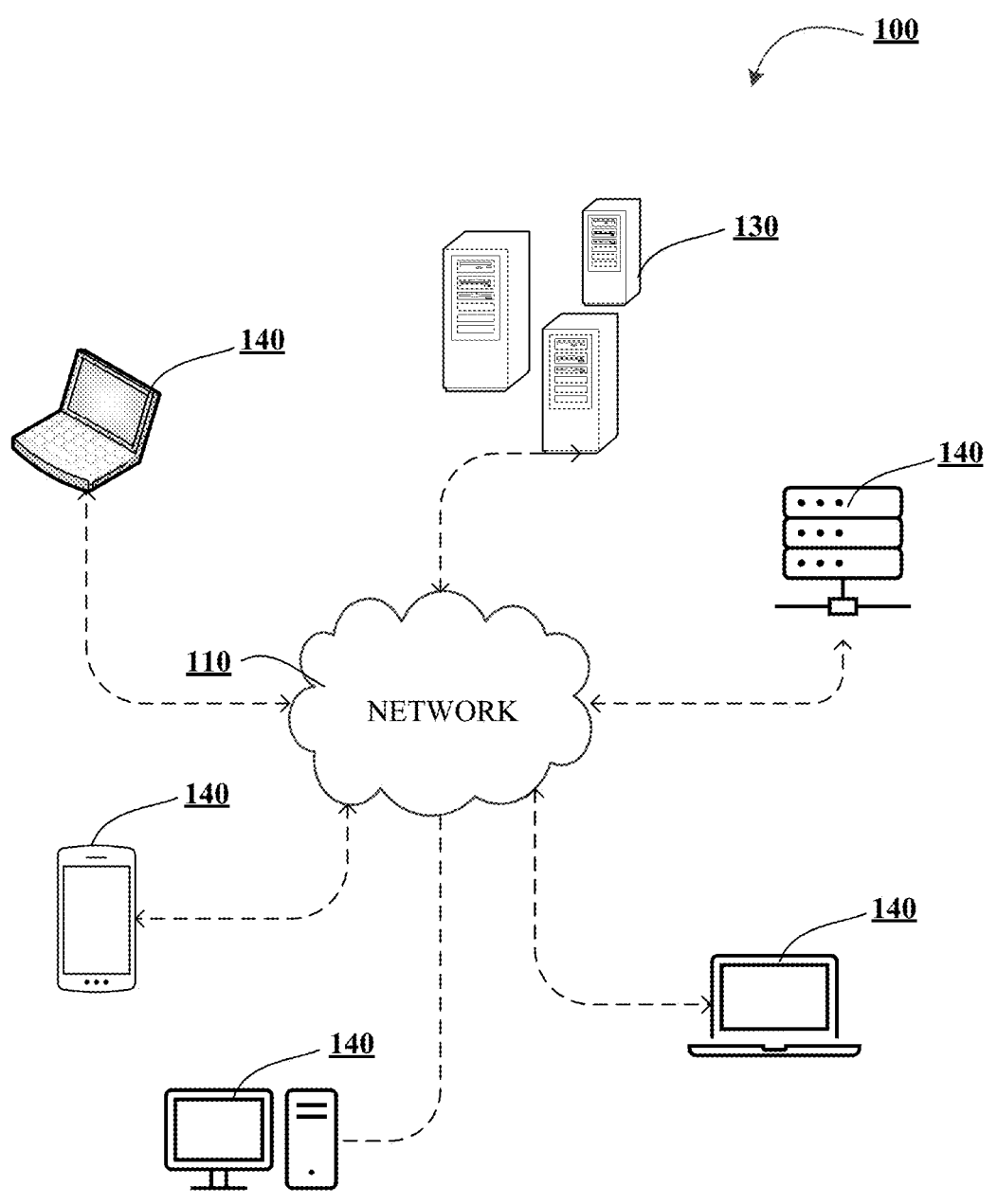
Figure 1B:
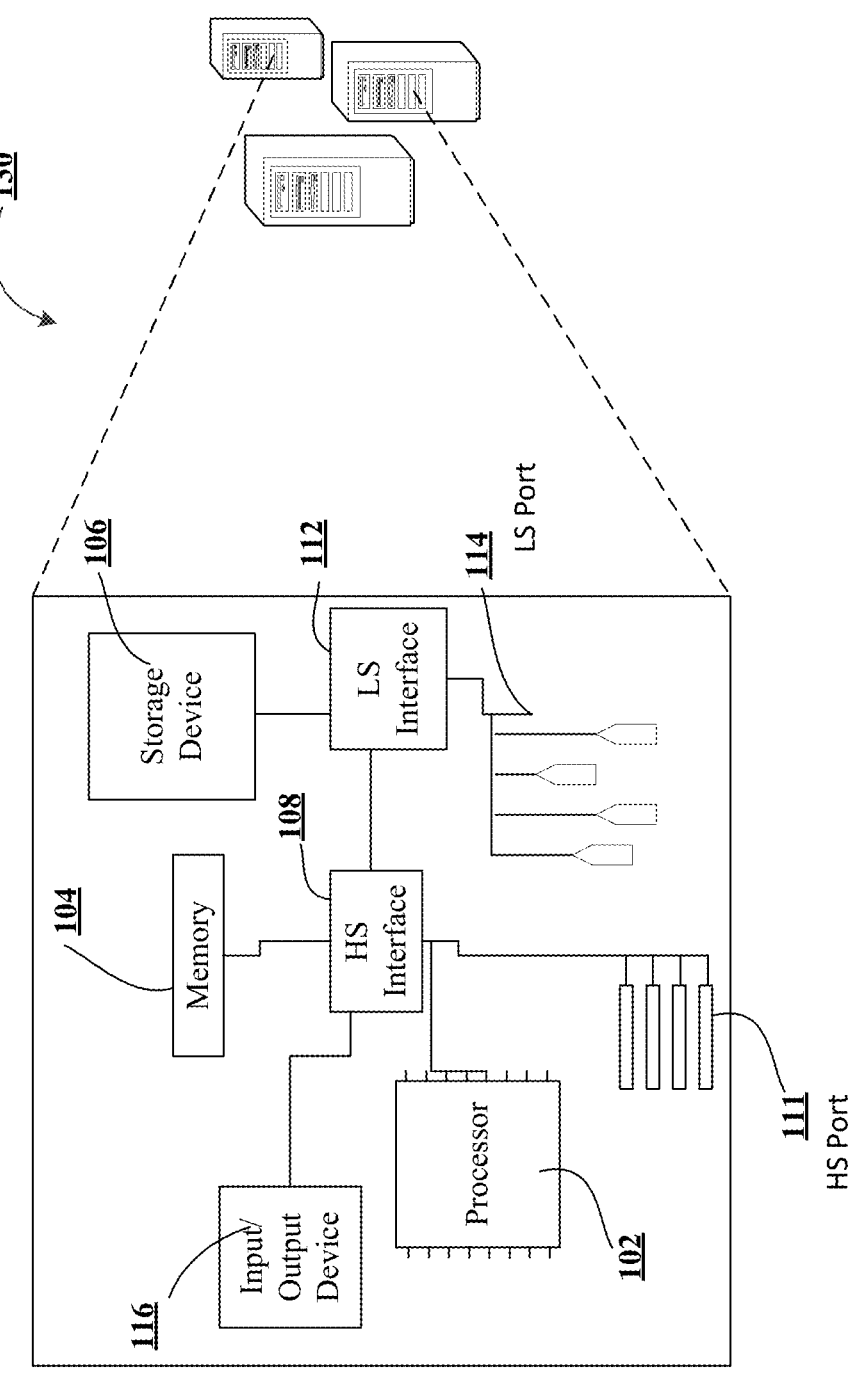
Figure 1C:
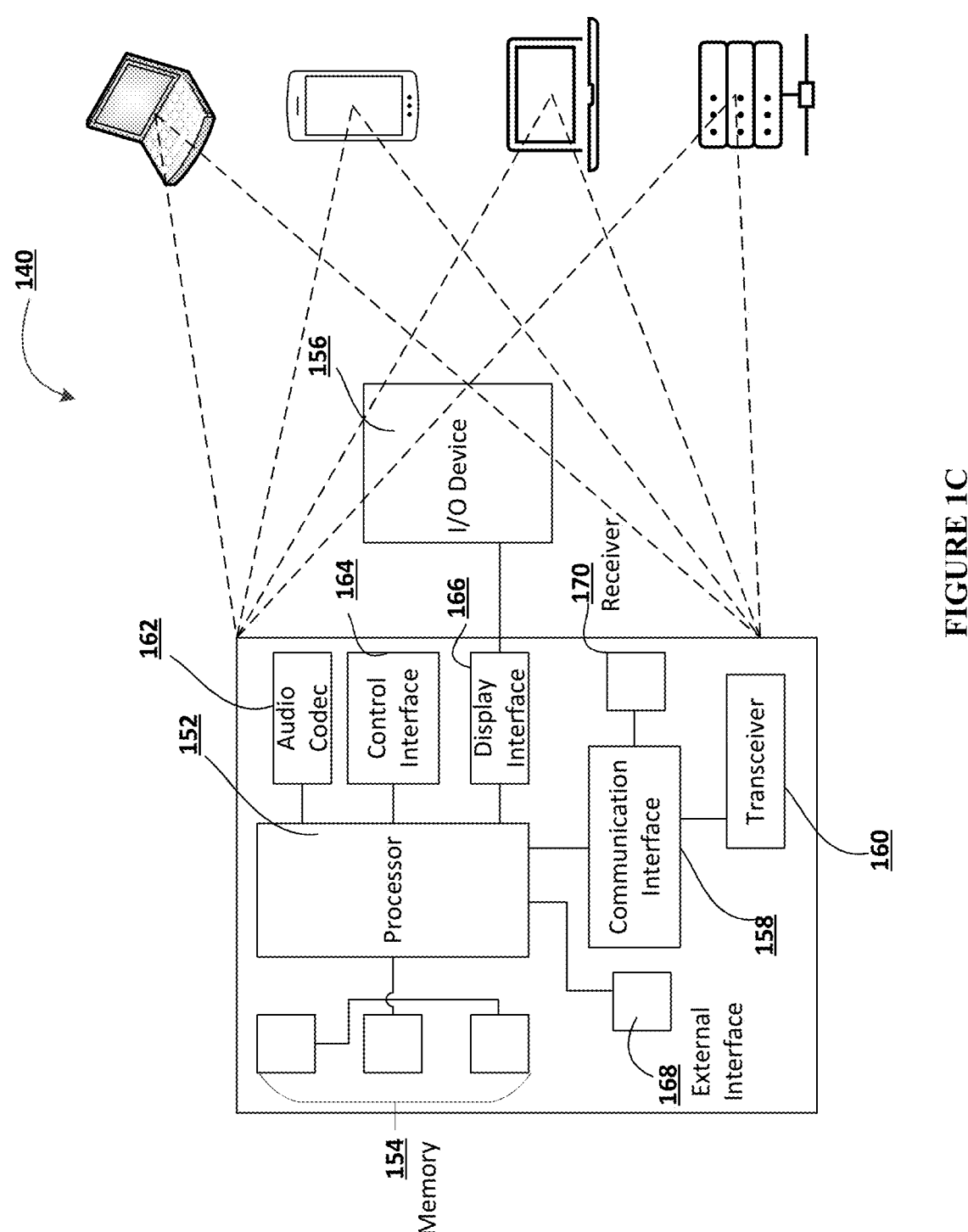
Figure 2:
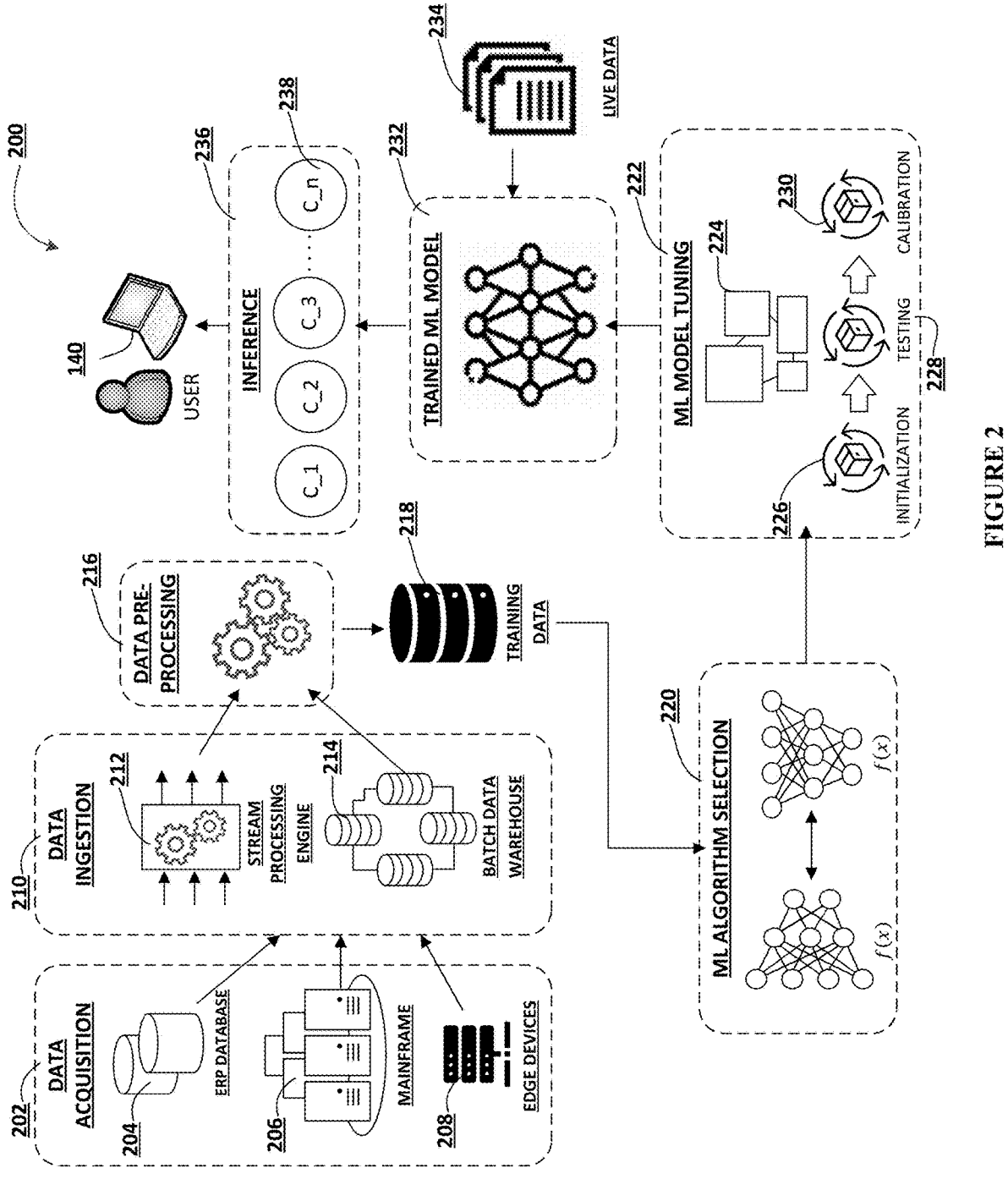
Figure 3B:
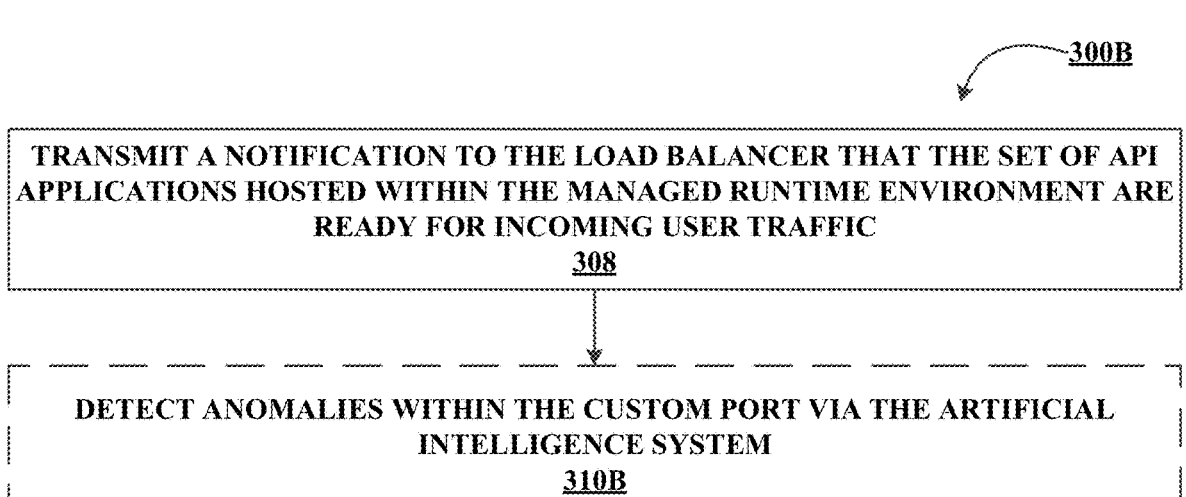

FIGS. 1A-1C illustrates technical components of an exemplary distributed computing environment for determining readiness for managed runtime application program interface (API) applications via artificial intelligence, in accordance with an embodiment of the disclosure;

FIG. 2 illustrates an exemplary machine learning (ML) subsystem architecture, in accordance with an embodiment of the disclosure; and FIGS. 3A and 3B illustrate a process flow for determining readiness for managed runtime API applications via artificial intelligence, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

A managed runtime environment (e.g., java virtual machine or JVM) may host a set of application program interface (API) applications or integration flows (e.g., applications created by MuleSoft). The set of API applications may be managed by load balancers that rely on port availability within the managed runtime environment to determine the readiness and health of applications to process incoming user traffic. Issues may arise when ports become available for user traffic before the set of API applications.

An influx of user traffic to the set of API applications before the applications and the components within the custom ports of the API applications are ready may lead to failed tasks. For instance, a transaction may not be processed within a managed runtime environment due if ports are available but the API applications may not be ready themselves. Additionally, while the ports may remain active, internal components within the applications may not function, which may cause delays or failure despite the applications appearing to be functional. Further, pauses and/or maintenance associated with the load balancer may result in additional failures and delays. Signaling readiness of the API applications while monitoring port availability may decrease the encountered issues described.

A custom port probe may be embedded within the set of API applications to monitor components within the application. The custom port probe may be at least partially powered by an artificial intelligence system that will ensure all components within the applications are fully operational, initialized, and that the custom port is available. The custom port probe may then signal the load balancer that the set of applications are ready to process incoming user traffic. Additionally, the health of the set of API applications and the components within the apps may be monitored by the artificial intelligent system within the custom port probe. With the enhanced signaling described, user traffic may be better regulated, anomalies may be better detected through the artificial intelligence system, and user traffic patterns may be used to create adaptive thresholds and parameters for determining readiness of the set of API applications.

Accordingly, the present disclosure describes how application program interface (API) applications (e.g., MuleSoft applications) hosted within managed runtime environments (e.g., java virtual machine) may be assessed on their ability to process incoming user traffic using machine learning and artificial intelligence. A custom port probe powered at least partially by the artificial intelligence system may be embedded within a custom port within the set of API applications. A load balancer, which may be operably coupled to the custom port and custom port probe, may determine the amount of user traffic processed by the set of API applications. The custom port probe may then initialize components within the custom port and verify readiness of the set of API applications and the custom port using the artificial intelligence system. Upon initialization and verification, a notification may be transmitted to the load balancer, indicating that the set of API applications and custom port are ready to process incoming user traffic. The artificial intelligence system embedded within the custom port probe may analyze the set of API applications to diagnose potential anomalies, adapt what constitutes the API applications to be ready for incoming traffic, and pause incoming traffic to the API applications and custom port via the load balancer.

What is more, the present disclosure provides a technical solution to a technical problem. As described herein, the technical problem includes determining readiness of managed runtime API applications. The technical solution presented herein allows for determining readiness of API applications via artificial intelligence. In particular, determining readiness for managed runtime API applications via artificial intelligence is an improvement over existing solutions to the issue of determining readiness of managed runtime API applications, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for determining readiness for managed runtime application program interface (API) applications via artificial intelligence 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link);

the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, or the like), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, or the like), an instance-based method (e.g., k-nearest neighbor, learning vector quantization, self-organizing map, or the like), a regularization method (e.g., ridge regression, least absolute shrinkage and selection operator, elastic net, or the like), a decision tree learning method (e.g., classification and regression tree, iterative dichotomiser 3, C4.5, chi-squared automatic interaction detection, decision stump, random forest, multivariate adaptive regression splines, gradient boosting machines, or the like), a Bayesian method (e.g., naïve Bayes, averaged one-dependence estimators, Bayesian belief network, or the like), a kernel method (e.g., a support vector machine, a radial basis function, or the like), a clustering method (e.g., k-means clustering, expectation maximization, or the like), an associated rule learning algorithm (e.g., an Apriori algorithm, an Eclat algorithm, or the like), an artificial neural network model (e.g., a Perceptron method, a back-propagation method, a Hopfield network method, a self-organizing map method, a learning vector quantization method, or the like), a deep learning algorithm (e.g., a restricted Boltzmann machine, a deep belief network method, a convolution network method, a stacked auto-encoder method, or the like), a dimensionality reduction method (e.g., principal component analysis, partial least squares regression, Sammon mapping, multidimensional scaling, projection pursuit, or the like), an ensemble method (e.g., boosting, bootstrapped aggregation, Ada-Boost, stacked generalization, gradient boosting machine method, random forest method, or the like), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow for determining readiness for managed runtime application program interface (API) applications via artificial intelligence. In some embodiments, a system (e.g., similar to one or more of the systems described herein with respect to FIGS. 1A-1C) and a form of artificial intelligence (e.g., similar to one or more machine learning subsystems described in FIG. 2) may perform one or more of the steps of process flow 300A and 300B.

As shown in Block 302, the process flow 300A may include the step of scanning a set of API applications and their associated custom port hosted within a managed runtime environment using a custom port probe embedded within the managed runtime environment. An API application may refer to software applications designed to expose functionalities and services via application programming interfaces (e.g., managed runtime environments based API applications created by MuleSoft). The set of API applications may host a plurality of APIs or integration flows and may be managed by a load balancer as described in greater detail below. The set of API applications may be monitored, managed, and analyzed by the custom port probe to determine "readiness" of the set of API applications (i.e., the ability of the set of API applications to process incoming traffic). The set of API applications may have readiness determined based on the volume and/or rate of change of traffic within the set of API applications when compared to a predetermined volume, threshold, and/or frequency. The custom port may refer to a logical access point through which network communications are managed for applications. The custom port may be used to identify processes or applications within the host system (e.g., the managed runtime environment) and enable the set of API applications to send and receive data over a network.

The custom port probe may be operably coupled to the load balancer within the managed runtime API. The custom port probe may be a mechanism, tool, software, and/or a configuration embedded within the managed runtime API and/or the custom port that may monitor and interact with the set of API applications. The custom port probe may be operably coupled to the custom port embedded within the managed runtime environment. The custom port probe may be configured to listen, record, and/or scan the custom port within the managed runtime environment associated with the set of API applications. Further, the custom port probe may be embedded within the managed runtime environment and/or within the custom port itself.

The managed runtime environment may be a software layer that provides a platform for executing applications, managing resources, and abstracting underlying hardware (e.g., Java virtual machine). The managed runtime environment may monitor the set of API applications across multiple systems by handling various system-level tasks including but not limited to memory management and security. The managed runtime environment may provide an execution space for the set of API applications can operate independently of a host system and enable platform-independent application deployment. The set of API applications may be supported by the managed runtime environment via built in mechanisms for resource allocation, network communication, and secure execution in addition to facilitating and managing user traffic/network traffic.

The load balancer may be operably coupled to the custom port probe to communicate readiness and traffic of the set of API applications therebetween. The load balancer may manage and/or direct requests associated with the set of API applications. Incoming user traffic may be distributed and redirected by the load balancer, and resources may be rearranged or utilized to optimize resource usage within the managed runtime environment. Interactions between the load balancer and the custom port probe may comprise notifications associated with the status of the set of API applications, including but not limited to the health of the API applications and the ability of the API applications to handle/process further traffic.

User traffic may refer to traffic from users of the API applications, network traffic, and/or traffic within the managed runtime environment may be processed by the set of API applications and the custom port. Incoming traffic may refer to network requests directed at the set of API application hosted within the managed runtime environment. Incoming user traffic may comprise network requests in the form of hypertext transfer protocol (HTTP), hypertext transfer protocol secure (HTTPS), and/or transmission control protocol (TCP). Incoming user traffic may refer to incoming traffic requests to the set of API applications.

As shown in Block 304, the process flow 300A may include the step of initializing a set of components within the custom port for operation within the managed runtime API. Initialization of the set of components may comprise ensuring that internal components of the custom port are operational before signaling readiness and reducing the occurrences of false positives. For instance, the custom port may be ready to process incoming traffic before the set of API applications are, resulting in a false positive signal that may cause delays and obstacles. Initializing the set of components may be conducted by checking for anchor files within the managed runtime environment during startup. In some embodiments, anchor files may be monitored by the custom port probe after initialization by matching anchor files to the set of components within the custom port to analyze and routinely check health of the set of API applications. Upon initialization, the readiness of the set of components within the custom port probe may be tested through verification.

As shown in Block 306, the process flow 300A may include the step of verifying readiness of the set of API applications and the components within the custom port via an artificial intelligence system. Verifying readiness of the set of API applications and the set of components within the custom port may comprise testing, checking, and/or confirming components within the custom port and API applications. For instance, verification of the custom port may comprise testing whether the custom port is available for incoming user traffic, confirming port binding to ensure that the custom port is bound to the intended endpoint within the managed runtime environment, checking security details associated with the custom port (e.g., firewalls, access control lists, blockage of predetermined addresses), ensuring service availability of the custom port, reviewing user traffic regulations, and or verifying compliance with intrusion detection protocols. Verification of readiness may further comprise ensuring, logging, and monitoring of the set of API applications and the custom port is enabled to track and/or regulate incoming user traffic during operation, reviewing port specific application layer configurations conform to predetermined guidelines/configurations of the managed runtime environment, and/or confirming that network access translation configurations comply with predetermined guidelines.

In some embodiments, the readiness of the set of API applications may be verified in addition to verifying the readiness of the set of components within the custom port. For instance, verifying readiness of the set of API applications may comprise reviewing authentication and authorization mechanisms within the set of API applications, ensuring the set of API applications may properly validate inputs, testing the sanitization processes regarding inputs to the set of API applications, checking rate controls and throttling processes of the set of API applications, testing error handling and logging capabilities of the set of API applications, reviewing security policies of the set of API applications (e.g., cross-origin reference sharing), confirming health of the set of API applications, and/or ensuring dependencies (e.g., external services, microservices, and/or third-party APIs) of the set of API applications are available and/or functioning such that negative impacts to upstream services are avoided. Verification of the set of API applications may further comprise data serialization and deserialization process checks (e.g., conversion of data types between different formats operates correctly), testing response time and latency of the set of API applications, and/or reviewing horizontal/vertical scaling and resource allocation capabilities that may process incoming user traffic to the set of API applications. For instance, verifying the set of API applications may comprise validating authentication tokens correctly, confirming sanitization processes are performing as intended, ensuring logging and handling mechanisms within the set of API applications are operating, and/or validate cross origin resource sharing capabilities.

Verification of the set of components within the custom port and/or verification of the set of API applications may be conducted via an artificial intelligence system. The artificial intelligence system may be a form of machine learning and/or machine learning models as previously discussed and exemplified within FIG. 2. The artificial intelligent system t may perform and analyze the initialization and verification processes described and providing inputs/recommendations for verifying readiness of the custom port and/or set of API applications. The artificial intelligence system may, for instance, provide a test input for the sanitization process of the custom port and/or the set of API applications. Sanitization processes may subsequently be updated based on the capabilities demonstrated by the set of API applications and/or the custom port. The artificial intelligence system may, in some embodiments, provide analytics, data, recommendations, and possible adjustments to the set of API applications and the custom port to remove readiness delays and/or processes associated with readiness that may be optimized. Full initialization and operation of the set of API applications and the set of components within the custom port may be conducted before the artificial intelligence system transmits/signals the load balancer that the set of API applications are ready to process further user traffic. The artificial intelligence system may further monitor the health of the set of components within the custom port and associated maintenance operations of the custom port.

As shown in Block 308, the process flow 300A may include the step of transmitting a notification to the load balancer that the set of API applications hosted within the managed runtime environment are ready for incoming user traffic. Transmission of the notification to the load balancer may comprise a signal, sign, and/or indication associated with the readiness of the set of API applications and/or the custom port within the managed runtime environment. For instance, the notification may indicate that the set of API applications are ready to process incoming user traffic. In another instance, the notification to the load balancer may indicate that the set of API applications are overburdened, and may indicate possible causes, estimated time until the set of API applications are ready, and/or obstacles for readiness of the set of API applications to process incoming user traffic. Upon reception of the notification, incoming user traffic may be processed by the set of API applications and/or the custom port within the managed runtime environment.

In some embodiments, the notification transmitted to the load balancer is generated by the artificial intelligence system. The artificial intelligence system may generate the notification, signal, sign, indication, and/or message to the load balancer indicating the extent of the set of API applications and the custom port is ready to process incoming user traffic. For instance, the artificial intelligence system may indicate that a portion of the set of API applications (e.g., 40%) and a portion of the set of components within the custom port (e.g., a list indicating which components within the custom port may be initialized and verified) are ready to process incoming user traffic. The artificial intelligence system may further determine the set of criteria that may determine whether the set of API applications and the custom port as ready to process incoming traffic. Anomalies detected by the artificial intelligence system may be collected and transmitted to the load balancer and/or a third party, as discussed in greater detail below.

In some embodiments, the notification further comprises a report comprising adjustments to the set of API applications and/or the set of components within the custom port. Adjustments to the set of API applications may be generated by the artificial intelligent system in response to anomalies discovered within the set of API applications and/or the custom port. For instance, the report may comprise components within the custom port or portions of the set of API applications that cause delays in readiness. The highlighted components and/or applications may then be adjusted accordingly to decrease the amount of time for the set of API applications to be designated as ready.

In some embodiments, as shown in Block 310A, the process flow 300A may include the step of pausing incoming user traffic to the managed runtime environment until traffic within the set of API applications and the custom port have been processed. Incoming user traffic may be paused within the set of API applications while the custom port user traffic may be maintained. Conversely, incoming user traffic may be paused within the custom port while user traffic within the set of API applications may be maintained. In some embodiments, pausing user traffic may be targeted to portions of the set of API applications. For instance, a portion of the set of API applications may be ready to process incoming traffic while a second portion may not be ready, which may result in the incoming user traffic to the second portion of the set of API applications being paused. In some embodiments, incoming traffic processed through a portion of the set of components within the custom port may be paused.

Turning now to FIG. 3B, in some embodiments, as shown in Block 310B, the process flow 300B may include the step of detecting anomalies within the custom port and/or the set of API applications via the artificial intelligence system. Anomalies within the custom port may be patterns and/or potential issues within the set of API applications and/or the custom port detected by the artificial intelligence system. In other words, the artificial intelligence system may learn potential issues that may cause delays in processing incoming user traffic. For instance, if one of the API applications within the set of API applications experiences delays in readiness when incoming traffic reaches a threshold, the anomaly may be detected and reported by the artificial intelligence system. Patterns associated with readiness of the set of API applications and the custom port may be analyzed and predicted by the artificial intelligence system as further data regarding readiness is collected through the artificial intelligence system.

In some embodiments, verification may be determined by a set of criteria produced by the artificial intelligence system. The set of criteria may be thresholds, measurements, regulations, ordinances, and/or guidelines that may determine verification of the custom port and/or the set of API applications. The set of criteria may be adaptable and change as the readiness threshold of the set of API applications and custom port readiness status change. For instance, the set of criteria may be changed in response to longer delays in the set of API applications, reduction of the processing ability of the custom port, and/or further issues associated with readiness of the set of API applications and the custom port.

In some embodiments, the set of criteria comprises operating standards of the set of components within the custom port. Operating standards within the set of criteria may comprise regulations, commands, directives and/or mandates that the set of API applications and the custom port may follow to become ready to process incoming user traffic. For instance, the set of criteria may be adapted based on the API application or the components within the custom port. The set of criteria may be adaptable to individual components within the set of API applications and the custom port.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for determining readiness for managed runtime application program interface (API) applications via artificial intelligence, the system comprising:
a processing device;
a non-transitory storage device containing instructions when executed by the processing device, causes the processing device to perform the steps of:
scan a set of application program interface (API) applications and their associated custom port hosted within a managed runtime environment using a custom port probe embedded within the managed runtime environment,
wherein the custom port probe is operably coupled to a load balancer within the managed runtime environment,
wherein the custom port probe is at least partially powered by an artificial intelligence system,
wherein user traffic within the managed runtime environment is processed by the set of API applications and custom port;
initialize a set of components within the custom port for operation within the managed runtime environment;
verify readiness of the set of API applications and the set of components within the custom port via the artificial intelligence system; and
transmit a notification to the load balancer that the set of API applications hosted within the managed runtime environment are ready for incoming user traffic.
2. The system of claim 1, wherein the processing device is further configured to pause incoming user traffic to the managed runtime environment until traffic within the set of API applications and the custom port has been processed.
3. The system of claim 1, wherein the processing device is further configured to detect anomalies within the custom port via the artificial intelligence system.

4. The system of claim 1, wherein verification of readiness of the set of components within the custom port is determined by a set of criteria produced by the artificial intelligence system.

5. The system of claim 4, wherein the set of criteria comprises operating standards of the set of components within the custom port.

6. The system of claim 1, wherein the notification transmitted to the load balancer is generated by the artificial intelligence system.

7. The system of claim 6, wherein the notification further comprises a report comprising adjustments to the set of API applications within the managed runtime environment.

8. A computer program product for determining readiness for managed runtime application program interface (API) applications via artificial intelligence, the computer program product comprising at least one non-transitory computer-readable medium having computer-readable program code portions embodied therein, the computer-readable program code portions which when executed by a processing device are configured to cause a processor to perform the following operations:

scan a set of application program interface (API) applications and their associated custom port hosted within a managed runtime environment using a custom port probe embedded within the managed runtime environment, wherein the custom port probe is operably coupled to a load balancer within the managed runtime environment, wherein the custom port probe is at least partially powered by an artificial intelligence system, wherein user traffic within the managed runtime environment is processed by the set of API applications and custom port;

initialize a set of components within the custom port for operation within the managed runtime environment;

verify readiness of the set of API applications and the set of components within the custom port via the artificial intelligence system; and transmit a notification to the load balancer that the set of API applications hosted within the managed runtime environment are ready for incoming user traffic.

9. The computer program product of claim 8, wherein the processing device is further configured to cause the processor to pause incoming user traffic to the managed runtime environment until traffic within the set of API applications and the custom port has been processed.

10. The computer program product of claim 8, wherein the processing device is further configured to cause the processor to detect anomalies within the custom port via the artificial intelligence system.

11. The computer program product of claim 8, wherein verification of readiness of the set of components within the custom port is determined by a set of criteria produced by the artificial intelligence system.

12. The computer program product of claim 11, wherein the set of criteria comprises operating standards of the set of components within the custom port.

13. The computer program product of claim 8, wherein the notification transmitted to the load balancer is generated by the artificial intelligence system.

14. The computer program product of claim 13, wherein the notification further comprises a report comprising adjustments to the set of API applications within the managed runtime environment.

15. A computer-implemented method for determining readiness for managed runtime application program interface (API) applications via artificial intelligence the method comprising:

scanning a set of application program interface (API) applications and their associated custom port hosted within a managed runtime environment using a custom port probe embedded within the managed runtime environment, wherein the custom port probe is operably coupled to a load balancer within the managed runtime environment, wherein the custom port probe is at least partially powered by an artificial intelligence system, wherein user traffic within the managed runtime environment is processed by the set of API applications and custom port;

initializing a set of components within the custom port for operation within the managed runtime environment;

verifying readiness of the set of API applications and the set of components within the custom port via the artificial intelligence system; and transmitting a notification to the load balancer that the set of API applications hosted within the managed runtime environment are ready for incoming user traffic.

16. The computer-implemented method of claim 15, wherein the computer-implemented method further comprises: pausing incoming user traffic to the managed runtime environment until traffic within the set of API applications and the custom port has been processed.

17. The computer-implemented method of claim 15, wherein the computer-implemented method further comprises detecting anomalies within the custom port via the artificial intelligence system.

18. The computer-implemented method of claim 15, wherein verifying readiness of the set of components within the custom port is determined by a set of criteria produced by the artificial intelligence system.

19. The computer-implemented method of claim 15, wherein the notification transmitted to the load balancer is generated by the artificial intelligence system.

20. The computer-implemented method of claim 19, wherein the notification further comprises a report comprising adjustments to the set of API applications within the managed runtime environment.

\* \* \* \* \*